(12) United States Patent
Sundararajan et al.

(10) Patent No.: US 12,425,350 B2
(45) Date of Patent: Sep. 23, 2025

(54) PACKET FRAGMENTATION PREVENTION IN AN SDWAN ROUTER

(71) Applicant: Cisco Technology, Inc., San Jose, CA (US)

(72) Inventors: Balaji Sundararajan, Fremont, CA (US); Ganesh Devendrachar, Milpitas, CA (US); Avinash Shah, Pleasanton, CA (US); Preety Mordani, Fremont, CA (US); Satyajit Das, Lake Tapps, WA (US); Michael John Moskal, Germantown, TN (US)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 18/133,975

(22) Filed: Apr. 12, 2023

(65) Prior Publication Data

US 2024/0348554 A1    Oct. 17, 2024

(51) Int. Cl.
| | |
|---|---|
| *H04L 12/24* | (2006.01) |
| *H04L 41/0803* | (2022.01) |
| *H04L 47/36* | (2022.01) |
| *H04L 47/43* | (2022.01) |

(52) U.S. Cl.
CPC .............. *H04L 47/43* (2022.05); *H04L 47/36* (2013.01)

(58) Field of Classification Search
CPC ........ H04L 47/43; H04L 47/36; H04L 47/125

USPC .......................................................... 709/238
See application file for complete search history.

(56) References Cited

U.S. PATENT DOCUMENTS

| | | | |
|---|---|---|---|
| 11,456,954 B1* | 9/2022 | Bajaj ..................... | H04L 45/566 |
| 2017/0155590 A1 | 6/2017 | Dillon et al. | |
| 2017/0302584 A1* | 10/2017 | Raj ......................... | H04L 47/36 |
| 2017/0373982 A1* | 12/2017 | Ashwood-Smith ..... | H04L 47/24 |
| 2019/0312820 A1* | 10/2019 | Yu ........................... | H04L 45/74 |
| 2020/0389409 A1* | 12/2020 | Karuppiah ............ | H04L 47/365 |
| 2021/0051112 A1* | 2/2021 | Wondra ............. | H04L 12/4633 |
| 2022/0286388 A1 | 9/2022 | Mermoud et al. | |
| 2023/0078814 A1* | 3/2023 | Zhang ................... | H04L 69/164 |
| | | | 370/329 |
| 2024/0031303 A1* | 1/2024 | Rao ....................... | H04L 47/365 |

\* cited by examiner

*Primary Examiner* — Ario Etienne
*Assistant Examiner* — Elizabeth Kassa
(74) *Attorney, Agent, or Firm* — Lee & Hayes, P.C.

(57) ABSTRACT

Techniques are described for avoiding data packet fragmentation in a routing device such as a router or network switch. Path Maximum Transport Unit (PMTU) values are monitored for a plurality of egress links of a networking device. A statistical analysis of fragmentation rates is performed. The statistical analysis can be performed on a per-link basis, per-flow basis or both per-link and per-flow basis. If the packet fragmentation rate of data flows through a particular egress link exceeds a determined threshold value, one or more data flows can be re-routed to a different egress link having a higher PMTU, thereby preventing data packet fragmentation.

20 Claims, 10 Drawing Sheets

PACKET FRAGMENTATION PREVENTION IN AN SDWAN ROUTER

TECHNICAL FIELD

The present disclosure relates generally to data packet fragmentation in an SD-WAN router, and more particularly to techniques for reducing or preventing data packet fragmentation for data flows egressing one or more egress links of the SD-WAN router.

BACKGROUND

Software Defined Wide Area Network (SD-WAN) is a software defined approach to managing a WAN such as the Internet. Advantages of SD-WAN include reducing cost with transport independence across MPLS, 4G/5G, LTE, and other connection types. SD-WAN also improves application performance and increases agility. SD-WAN can optimize user experience and efficiency for Software as a Service (Saas) and public cloud applications. SD-WAN can also simplify operations with automation and cloud-based management.

In a typical SD-WAN router, the transport link's Path Maximum Transfer Unit (PMTU) fluctuates. If data packets egressing from the SD-WAN router exceed the PMTU, the data packet must be fragmented into multiple data packets having transfer unit lower than the egress link's PMTU. When the fragmented data packets reach their destination, they must then be reassembled or de-fragmented. Fragmenting and defragmenting is a is a heavy, costly and time-consuming operation. Fragmenting and defragmenting the data packets puts processing load on "state full" features like DPI, SNORT, FW as the have to fully reassemble the packets for their functionality to work. In addition, due to processing needed to fragment and reassemble the data packets fragmentation induces jitter.

In an SD-WAN router having multiple egress links (e.g. three egress links) each link can have different PMTU values, which as described above can change over time. The routing of data flows through the egress links can be determined by an Application Aware Routing (AAR) algorithm. Because the egress link for a data flow is chosen by AAR, long data flows can be "sticky" to a particular egress link. If that data flow tends to have a lot of data packets that exceed the PMTU of the egress link chosen by the AAR algorithm, that data flow can have an excessively high rate of fragmentation, leading to performance problems.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
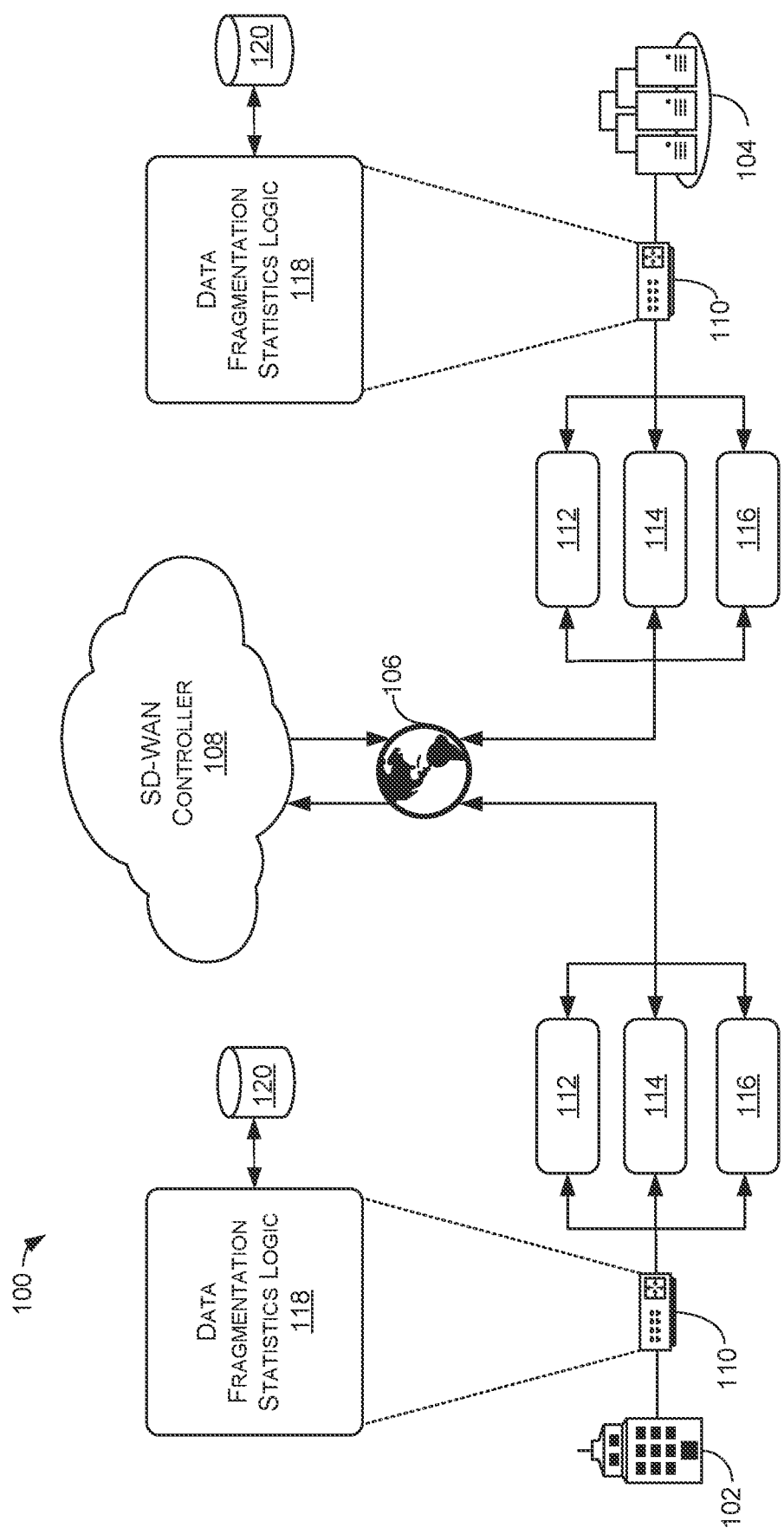
FIG. 1 illustrates schematic of an SD-WAN network architecture in which an embodiment can be implemented.

Embodiments described herein provide techniques for reducing data packet fragmentation in an SD-WAN router. The techniques include determining a Path Maximum Transfer Unit (PMTU) for each of a plurality of egress links of the SD-WAN router. The PMTU can be detected by a PMTU probe and can be periodically determined and monitored. The PMTU of each egress link can be stored in a database in computer memory such as solid-state memory, magnetic memory, etc. Data Packet fragmentation rates are detected and monitored for data flows egressing through one or more of the egress links. The detection and monitoring of the data flows can be performed on a per-link basis or on a per-flow basis. A statistical analysis is performed to determine whether a data packet fragmentation rate exceeds a predetermined threshold. Determining whether the data packet fragmentation rate exceeds a predetermined threshold can be performed so as to determine whether a particular data flow has a fragmentation rate that exceeds the predetermined threshold (per-flow basis) or could be performed so as to determine whether the data packet fragmentation rate of a particular egress link exceeds a predetermined value (per-link basis). If it is determined that a data packet fragmentation rate exceeds a threshold value, one or more data flows are re-routed to an egress link or links having a higher PMTU value than the egress link that the fragmented data packet was originally egressing from.

The monitoring of data packet fragmentation can be performed on a per flow or per egress link basis. For example, the fragmentation rate of data packets of a particular data flow can be monitored and if the fragmentation rate exceeds an allowable threshold value the data flow can be re-routed to an egress port having a higher PMTU value. Alternatively, or additionally, the data packet fragmentation rate for the egress links can be monitored. If the data packet fragmentation rate of a particular egress link as a whole exceeds the allowable threshold value, one or more data flows can be re-routed from that egress line to one or more other egress links.

Additionally, the techniques described herein may be performed by a system and/or device having non-transitory computer-readable media storing computer-executable instructions that, when executed by one or more processors, performs the method described above.

EXAMPLE EMBODIMENTS

A Software Defined Wide Area Network (SD-WAN) is a wide area network that uses software-defined network technology, such as communicating over the Internet using overlay tunnels which are encrypted when destined for internal organization locations. If standard tunnel setup and configuration messages are supported by all of the network hardware vendors, SD-WAN simplifies the management and operation of a WAN by decoupling the networking hardware from its control mechanism. This concept is similar to how software-defined networking implements virtualization technology to improve data center management and operation. In practice, proprietary protocols are used to set up and manage an SD-WAN, meaning there is no decoupling of the hardware and its control mechanism.

A key application of SD-WAN is to allow companies to build higher-performance WANs using lower-cost and commercially available Internet access, enabling businesses to partially or wholly replace more expensive private WAN connection technologies such as Multiprotocol Label Switching (MPLS). When SD-WAN traffic is carried over the Internet, there are no end-to-end performance guarantees. Carrier MPLS VPN WAN services are not carried as Internet traffic, but rather over carefully controlled carrier capacity, and can come with an end-to-end performance guarantee.

WANs were important for the development of networking technologies in general and were for a long time one of the most important applications of networks both for military and enterprise applications. The ability to communicate data over large distances was one of the main driving factors for the development of data communications technologies, as it made it possible to overcome the distance limitations, as well as shortening the time necessary to exchange messages with other parties.

Legacy WAN technologies allowed communication over circuits connecting two or more endpoints. Earlier technologies supported point-to-point communication over a slow speed circuit, usually between two fixed locations. As technology evolved, WAN circuits became faster and more flexible. Innovations like circuit and packet switching allowed communication to become more dynamic, supporting ever-growing networks.

The need for strict control, security and quality of service meant that multinational corporations were very conservative in leasing and operating their WANs. National regulations restricted the companies that could provide local service in each country, and complex arrangements were necessary to establish truly global networks. All of that changed with the growth of the Internet, which allowed entities around the world to connect to each other. However, over the first years, the uncontrolled nature of the Internet was not considered adequate or safe for private corporate use.

Independent of safety concerns, connectivity to the Internet became a necessity to the point where every branch required Internet access. At first, due to safety concerns, private communications were still done via a private WAN, and communications with other entities (including customers and partners) moved to the Internet.

As the Internet grew in reach and maturity, companies started to evaluate how to leverage it for private corporate communications. Eventually, application delivery over the WAN became an important topic of research and commercial innovation. Over the next decade, increasing computing power made it possible to create software-based applications that were able to analyze traffic and make informed decisions in real time, making it possible to create large-scale overlay networks over the public Internet that could replicate all of the functionality of legacy WANs at a fraction of the cost.

SD-WAN combines several technologies to create full-fledged private networks, with the ability to dynamically share network bandwidth across the connection points. Additional enhancements include central controllers, zero-touch provisioning, integrated analytics and on-demand circuit provisioning, with some network intelligence based remotely in the cloud, allowing centralized policy management and security.

Networking publications started using the SD-WAN to describe this networking trend. With the rapid shift to remote work, SD-WAN grew in popularity as a way of connecting remote workers.

WANs allow companies to extend their computer networks over large distances, connecting remote branch offices to data centers and to each other and delivering applications and services required to perform business functions. Due to the physical constraints imposed by the propagation time over large distances, and the need to integrate multiple service providers to cover global geographies, WANs face important operational challenges including: network congestion: packet delay variation: packet loss; and even service outages. Modern applications such as Voice over Internet Protocol (VOIP), videoconferencing, streaming media, and virtualized applications and desktops require low latency. Bandwidth requirements are also increasing, especially for applications featuring high-definition video. It can be expensive and difficult to expand WAN capability with corresponding difficulties related to network management and troubleshooting. SD-WAN products can be physical appliances or software based only.

SD-WAN architecture can include an SD-WAN Edge. SD-WAN Gateway. SD-WAN Controller and an SD-WAN Orchestrator. The SD-WAN edge is a physical or virtual function that is placed at an organization's branch, regional, or central office site, data center, in public or private cloud platforms. SD-WAN Gateways provide access to the SD-WAN service in order to shorten the distance to cloud-based services or the user and reduce service interruptions. A distributed network of gateways may be included in an SD-WAN service by the vendor or setup and maintained by the organization using the service. By sitting outside the headquarters in the cloud, the gateway also reduces traffic of the headquarter.

The SD-WAN orchestrator is a cloud hosted or on-premises web management tool that allows configuration, provisioning and other functions when operating an SD-WAN. It simplifies application traffic management by allowing central implementation of an organization's business policies. The SD-WAN controller functionality, which can be placed in the Orchestrator or in the SD-WAN Gateway, is used to make forwarding decisions for application flows. Application flows are IP packets that have been classified to determine their user application or grouping of applications to which they are associated. The grouping of application flows based on a common type, e.g., conferencing applications, is referred to as an Application Flow Group (AFG). The SD-WAN Edge classifies incoming IP packets at the SD-WAN User Network Interface (UNI), determines which application flow the IP packets belong to, and then applies the policies to block the application flow or allow the application flows to be forwarded based on the availability of a route to the destination on a remote SD-WAN Edge. This helps to ensure that the application meets its Service Level Agreements (SLAs).

FIG. 1 is a schematic illustration of a Software Defined Wide Area Network (SD-WAN) network architecture system 100. The SD-WAN system 100 can provide secure cloud-based connectivity between two or more business entities such as business facilities 102, 104. The business facilities 102, 104 can be various types of entities such as, but not limited to office buildings, factories, datacenters, remote worker offices or computers, etc. The business facilities 102, 104 can be connected with one another over a Wide Area Network 106 such as the Internet. Data flow between the business facilities can be managed by a cloud-based, remote SD-WAN controller 108. The SD-WAN controller 108 can reside on one or more servers that are remote from the business facilities 102, 104 and which can be securely connected with the business facilities over the WAN 106.

The SD-WAN controller 108 can be a software define internet controller that can separate the data-plane from the control plane and can virtualize much of the routing that used to be performed by dedicated networking hardware. The SD-WAN controller 108 can be part of a virtualized network that runs as an overlay on cost-effective hardware, whether physical routers or virtual devices. Centralized controllers, oversee the control plane of the SD-WAN fabric, efficiently managing provisioning, maintenance, and security for the entire SD-WAN overlay network.

Data flow between the between the business entities 102, 104 and to and from the WAN 106 can be facilitated by one or more network routing or switching devices 110, referred to herein as SD-WAN routers 110. Each of the SD-WAN routers 110 has multiple data links 112, 114, 116 through which data packets can egress from the SD-WAN router 110. Each of the egress links 112, 114, 116 has a path Maximum Transmission Unit (MTU) or path MTU value. The path MTU refers to the maximum size of a data packet that can egress through a given link 112, 114, 116. If a data packet egressing through a link exceeds that links path MTU, then the data packet must be fragmented into multiple smaller data packets before it can egress through the link. When the data packet arrives at a destination router, it must then be de-fragmented. This process is time consuming and costly and is preferably avoided in order to maximize performance of a data network.

In order to reduce or prevent such packet fragmentation, one or more of the SD-WAN routers 110 includes Data Fragmentation Statics Logic 118. The Data Fragmentation Statics Logic 118 can include circuitry and logic for monitoring fragmentation rates of data flowing through the egress links 112, 114, 116 of SD-WAN router 110. In one embodiment, the Data Fragmentation Statics Logic 118 can monitor the rate of packet fragmentation through each link 112. If one particular link (for example link 112) has a packet fragmentation rate that is above an acceptable threshold value, the Data Fragmentation Statics Logic can route some of the data traffic from the particular link (e.g., 112) to one or more of the other links (e.g., 114, 116). The Data Fragmentation Statics Logic 118 can make the other links 114, 116 more preferable than the link 112 that is experiencing excessive data packet fragmentation.

In another aspect of the invention, the Data Fragmentation Statics Logic 118 can monitor the data fragmentation rate on a per data flow basis. If a particular data flow is egressing through a particular link (e.g., 112) and is experiencing a data packet fragmentation rate that is above an acceptable threshold, that data flow can be rerouted to another link (e.g. 114 or 116).

In order to perform this function, the Data Fragmentation Statistics Logic 118 can include knowledge of the path MTU for each of the links 112, 114, 116. The path MTU of the links 112, 114, 116 can be periodically monitored. The path MTU information can be stored in a database, which can be stored in computer memory 120 in the SD-WAN router. The computer memory can be, for example, solid state memory, magnetic memory, volatile or non-volatile memory, etc.

Figure 2:
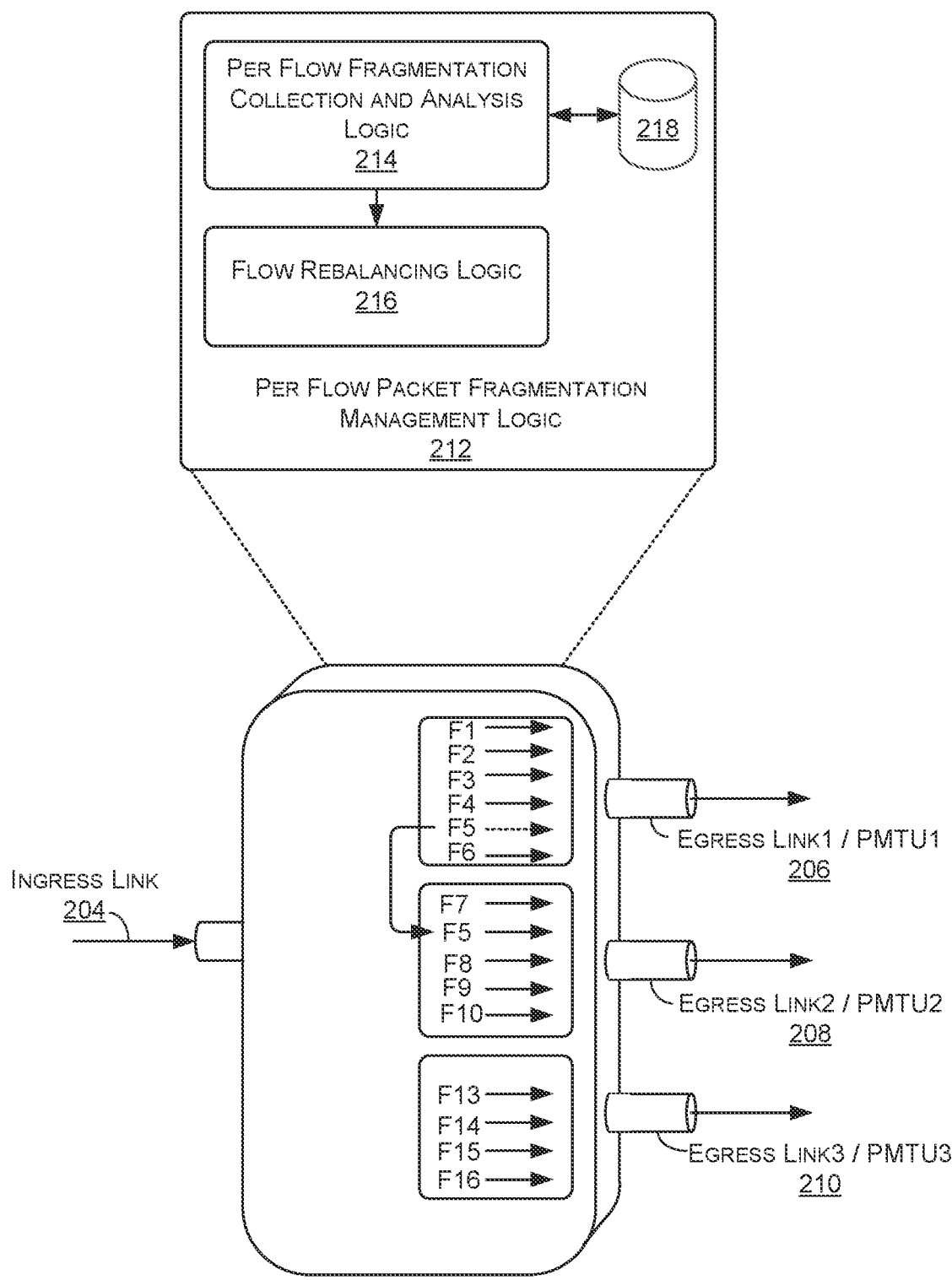
FIG. 2 illustrates a schematic illustration of an SD-WAN router employing Data Fragmentation Logic for monitoring and reducing data fragmentation on a per flow basis according to an alternate embodiment.

FIG. 2 shows a schematic illustration of an SD-WAN router 202 enlarged and in greater detail in order to illustrate techniques for preventing data packet fragmentation according to an embodiment. The SD-WAN router 202 has an ingress link 204 and multiple egress links: egress link1 206: egress link2 208, and egress link3 210. Each of the egress links 206, 208, 210 has its own path MTU (PMTU). Egress link1 206 has a PMTU1, egress link2 208 has PMTU2, and egress link3 210 has PMTU3. The egress links 206, 208, 210 can provide links to different types of network connections. In one embodiment, egress link 1 206 can be a link to a Long Term Evolution (LTE) network. The LTE network connection can be a fourth generation (4G) network connection, which can be a standard wireless data transmission that allows downloads of data such as music, etc. Egress link2 208 can be a public-Internet connection. Egress link 3 can be another type of connection such as a third generation (3G) connection or fifth generation (5G) connection.

The SD-WAN router includes Per Flow Packet Fragmentation Logic 212. The Per Flow Packet Fragmentation Management Logic 212 can be embodied within the SD-WAN router 202 and can be implemented by a Central Processing Unit (CPU) within the SD-WAN router 202, implemented by circuitry such as Application Specific Integrated Circuitry (ASIC) or both CPU and ASIC.

The Per Flow Packet Fragmentation Management logic 212 can include Per Flow Fragmentation and Analysis Logic 214, Flow Rebalancing Logic 216, and may include a database 218. The Per Flow Fragmentation Logic 218 collects data regarding the per flow fragmentation rate of data flows traversing through the egress links 206, 208, 210. By way of example, the Egress Links 206, 208, 210 can transport multiple data flows F1-F16. Each data flow F1-F16 can include multiple data packets that can be identified as belonging to a particular data flow according to Internet Protocol (IP) such as IP version 6, IPv6 and can be identified by packet header information. When service side data traffic is egressing through the egress links 206, 208, 210, traffic is hashed based on hashing such as based on a 5 tuple that can identify a data packet as belonging to a particular data flow: Transport links 206, 208, 210 are initially chosen based on Application Aware Routing (AAR) algorithms to serve Service Level Agreements (SLAs). Using AAR algorithms can allow long data flows to become stuck with a particular egress link 206, 208, 210.

The Per Flow Packet Fragmentation Management Logic 212 monitors the egress links 206, 208, 210 to determine a path MTU for each egress link 206, 208, 210. The path MTU for each egress link 218 can be stored in the database 218 and updated periodically. The Per Flow Fragmentation Collection and Analysis Logic collects data fragmentation rates for each of data flow F1-F16. This data flow information can be stored in the database 218 along with the path MTU data. The Per Flow Packet Fragmentation Management Logic 212 continuously monitors the packet fragmentation rates of each data flow F1-F16.

If the fragmentation rate of a particular data flow (e.g. F5) exceeds an acceptable threshold, the Per Flow Fragmentation Collection and Analysis Logic employs the Flow Rebalancing Logic 216 to reroute the data flow. The Flow Rebalancing Logic 216 checks the database 218 to compare the path MTU of the egress links 206, 208, 210 to determine whether another data link has a higher path MTU than the data link through which the data flow is traveling. The Per Flow Packet Fragmentation Management Logic then reroutes the data flow to an egress link having a higher path MTU in order to prevent further data packet fragmentation.

As an example implementation, the Per Flow Fragmentation Collection and Analysis Logic 214 determines that data flow F5 has a fragmentation rate that exceeds an acceptable, predetermined threshold. The Flow Rebalancing Logic 216 compares the path MTU of egress link 206 with the path MTU of egress links 208 and 210. If the Flow Rebalancing Logic 216 determines that egress link 208 has a higher path MTU than egress link 206, the Flow Rebalancing Logic 216 reroutes data flow F5 from egress link 206 to egress link 208. The Per Flow Packet Fragmentation Management Logic 212 over-rides Application Aware Routing (AAR) algorithm to change the egress link selection determined by the (AAR) algorithm to a different egress link in order to prevent data fragmentation.

Figure 3:
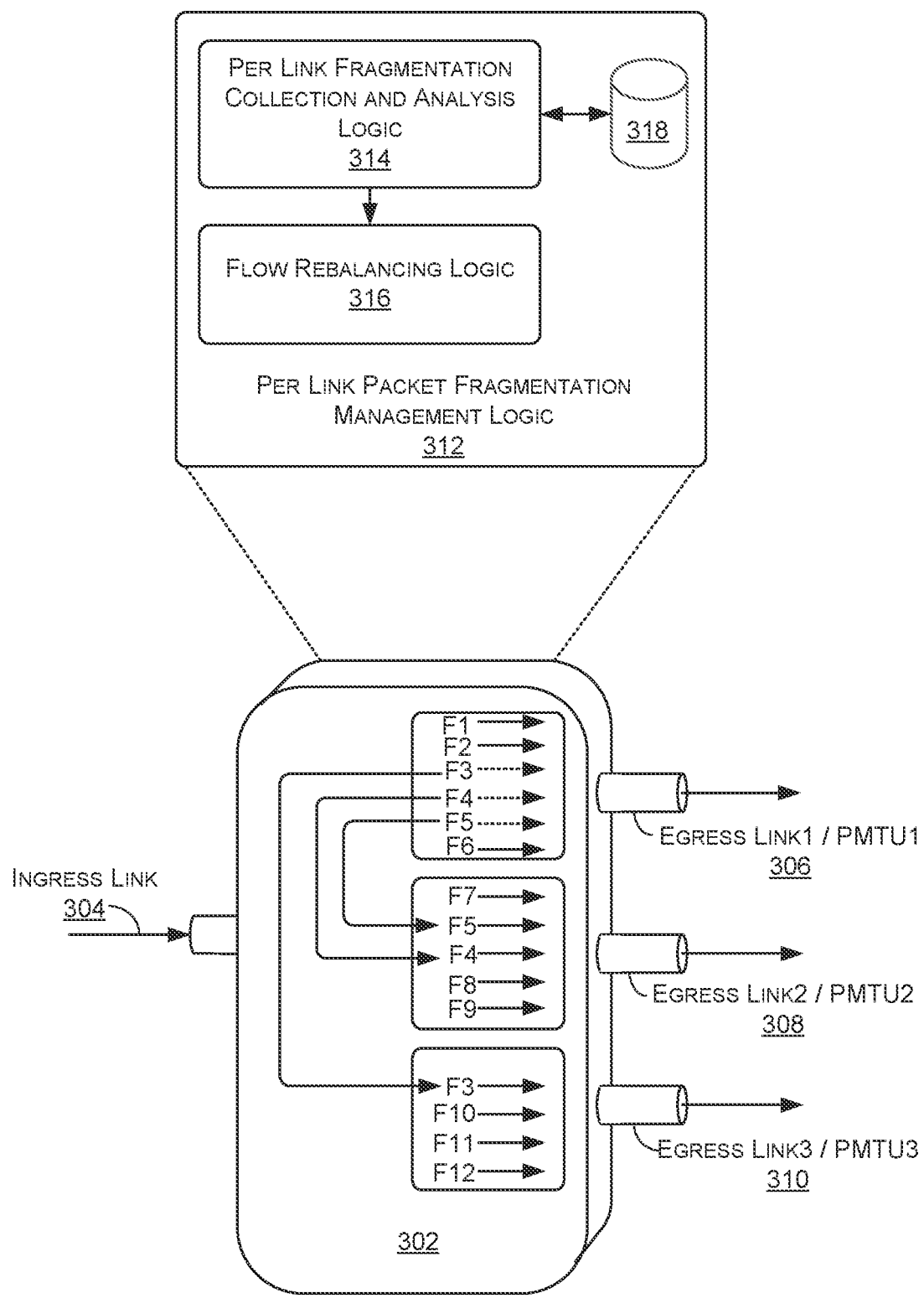
FIG. 3 illustrates a schematic illustration of an SD-WAN router employing Data Fragmentation Logic for monitoring and reducing data fragmentation on a per egress link basis according to an alternate embodiment.

FIG. 3 illustrates an SD-WAN router 302 performing per link packet fragmentation mitigation. While FIGS. 2 and 3 illustrate individual, different SD-WAN routers for performing per flow rerouting (FIG. 2) and per link rerouting (FIG. 3) it should be understood that this by way of more clearly illustrating the techniques described herein. A single SD-WAN router can be configured to perform both per flow analysis and rerouting and per link analysis and rerouting.

The SD-WAN router 302 includes an ingress link 304 and a plurality of egress links 306, 308, 310 each having it own PMTU value. Egress link1 306 has a PMTU1. Egress link2 308 has a PMTU2, and Egress link3 210 has a PMTU3. Various data flows, represented as arrows F1-F12 can egress from the SD-WAN router 302 through the egress links 306, 308, 310. Initially, the delegation of data flows to a particular egress link 306, 308, 310 can be performed by an Application Aware Routing (AAR) algorithm.

The SD-WAN router 302 includes Per Link Packet Fragmentation Management Logic 312, which can reside in memory or circuitry within the SD-WAN router 302. The Per Link Packet Fragmentation Management Logic 312 can be implemented through CPU, or dedicated circuitry such as Application Specific Integrated Circuitry (ASIC), and can be stored in circuitry, solid state memory magnetic memory, etc. The Per Link Packet Fragmentation Management Logic 312 includes Per Link Fragmentation Link Fragmentation Collection and Analysis Logic 314 and Flow Rebalancing Logic 316. The Per Link Packet Fragmentation Management Logic 312 may also contain a database 318 which may be stored in computer memory such as circuitry, solid state memory, magnetic memory, etc.

The Per Link Packet Fragmentation Management Logic 312 periodically monitors the egress links 306, 308, 310 to determine each link's PMTU value. The PMTU values of the links 306, 308, 310 can be stored in the database 318. In addition, the Per Link Fragmentation Collection and Analysis Logic 314 collects fragmentation rates of each egress link 306, 308, 310. In this case, the fragmentation rates are determined and collected on a per link basis rather than on a per flow basis. The collected per link fragmentation rate data can be stored in the database 318.

The Per Link Fragmentation Collection and Analysis Logic monitors the per link fragmentation rates for each egress link 306, 308, 310 and compares the per link fragmentation rates to a predetermined threshold to determine whether any of the egress links has a fragmentation rate that exceeds the predetermined threshold value. If an egress link 306, 308, 310 has a data packet fragmentation rate that exceeds the threshold value, the Per Link Fragmentation Collection and Analysis Logic employs the Flow Rebalancing Logic 316 to reroute one or more data flows from the egress link having too high of a fragmentation rate to another egress link. The Flow Rebalancing Logic 316 makes the egress link having too high of a fragmentation rate less desirable for flow routing than other egress links having a lower fragmentation rate. In one embodiment, the Flow Rebalancing Logic overrides the egress link selection determined by the AAR algorithm in order to reduce or prevent data packet fragmentation.

As an illustrative example, the Per Link Packet Fragmentation Management Logic 312 monitors the PMTU of each of the Egress Links 306, 308, 310 and stores these values in the database 318. The Per Link Fragmentation Collection and Analysis Logic also monitors the data packet fragmentation rates of each of the egress links 306, 308, 310, and compares these data packet fragmentation rates to the predetermined threshold. In this example, the Per Link Fragmentation Collection Analysis Logic determines that Egress Link1 306 has a data packet fragmentation rate that exceeds the predetermined threshold. The flow Rebalancing Logic is then employed to override the egress link selection determined by the AAR and routs some of the data flows F3, F4, F5 to other egress links 308, 310. In this example, data flow F3 is rerouted to Egress Link3 310, and data flows F4 and F5 are rerouted to Egress Link2 308. In one embodiment, the fragmentation rates of each of the data flows can also be compared with the PMTU of each egress link 306, 308, 310 to determine which egress link to route each data flow to. For example, if data flow F3 has a higher fragmentation rate than data flows F4 and F5, and Egress Link3 310 has a higher PMTU than Egress Link3 310, then the flow F3 can be rerouted to Egress Link3, while data flows F4 and F5 can be rerouted to Egress Link2 308. In this case, the fragmentation mitigation techniques provide a hybrid per flow and per link fragmentation mitigation.

Figure 4:
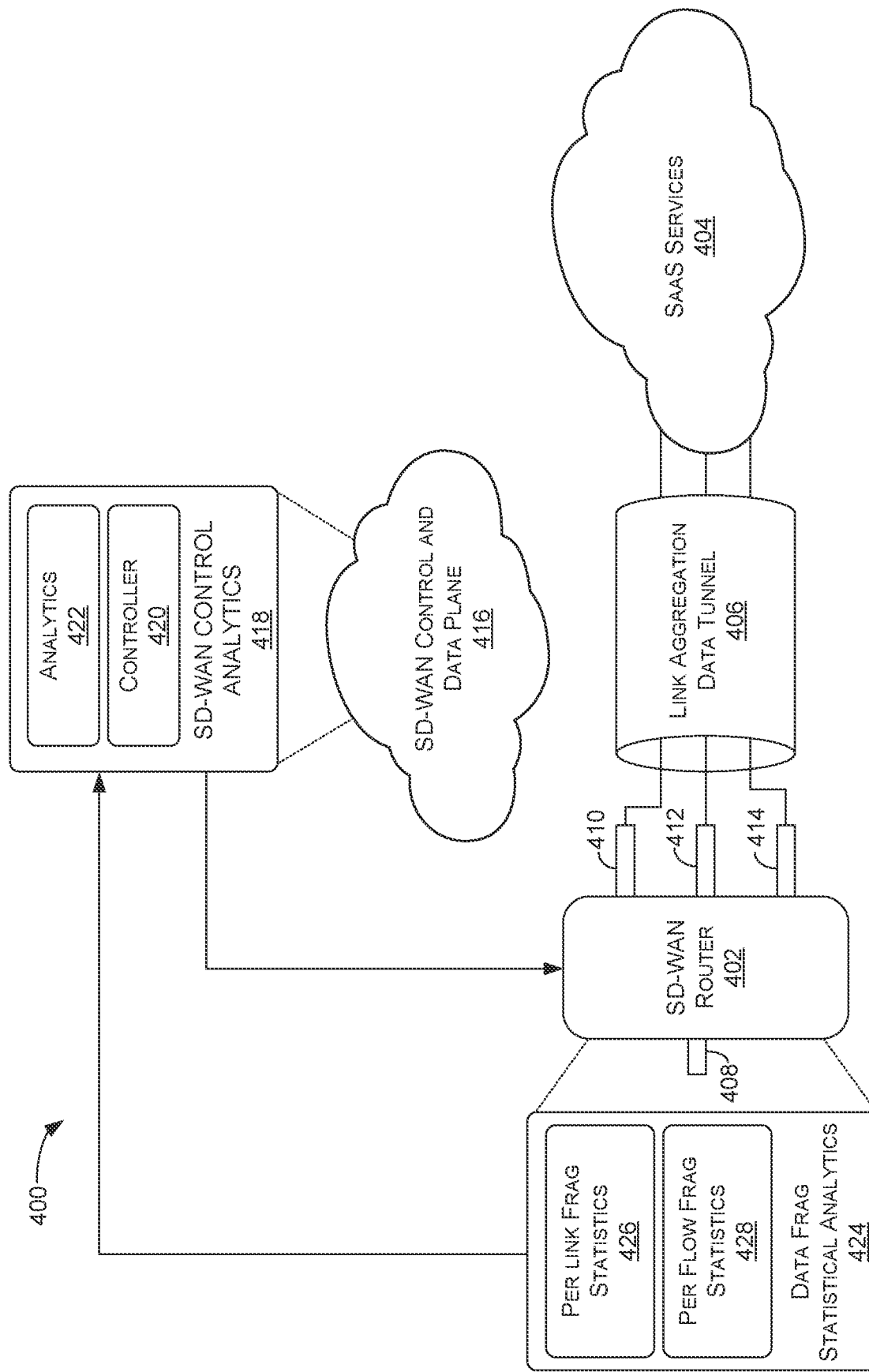
FIG. 4 illustrates schematic illustration of an SD-WAN network architecture employing an SD-WAN router having data fragmentation statistics analysis logic wherein fragmentation statistical information is shared with SD-WAN Control Analytics.

FIG. 4 is a schematic illustration of an SD-WAN network architecture 400 employing an SD-WAN router 402 with packet fragmentation reduction capabilities. The router 402 can access various Software as a Service (Saas) cloud based applications 404 via a Wide Area Network (WAN) such as the Internet. In one embodiment, the SD-WAN router 402 can access the SaaS services 404 through a Link Aggregation Tunnel 406. As with the previously described embodiment, the SD-WAN router 402 can include an ingress link 408, and multiple egress links 410, 412, 414. Data flow through the egress links 410, 412, 414 can be combined by link aggregation to flow through the Link Aggregation Tunnel to access the various cloud based SaaS services or applications 404. As discussed above, the allocation of data flows through each of the egress links 410, 412, 414 can be initially determined by an Application Aware Routing (AAR) algorithm to determine an initial most efficient allocation of data flows through the egress links 410, 412, 414.

Data flow through the SD-WAN router 402, as well as other network devices (not shown) can be managed by a cloud-based SD-WAN Control and Data Plane 416. The SD-WAN Control and Data Plane can include logic, software, hardware, etc. to provide an SD-WAN Control Analytics 418. The SD-WAN control analytics can include a controller 420 which includes logic or software that functions as a data plane management system such as Cisco's vSmart®. The controller can act as the brain of the SD-WAN control analytics 418. The controller 420 can be configured as a virtual machine connected remotely with the SD-WAN router via a WAN network such as the Internet. The controller 420 controls data plane policies of routing and security. It is positioned centrally in topology with edge devices (not shown). The controller 420 manages the implementation of control plane policies, centralized data policies, service chaining, and Virtual Private Network (VPN) topologies in various SD-WAN devices including the SD-WAN router 402. The controller 420 can manage the security and encryption of network fabric by providing key management. SD-WAN Control Analytics 418 also includes analytics logic and/or circuitry 422 such as Cisco's vAnalytics®. The analytics logic 422 provides continuously updated information regarding network performance. The analytics logic 422 can provide information such as latency, error rate, etc. It can also provide an intuitive interface to correlate application performance with underlying networks for operational insights.

The SD-WAN Router 402 includes logic and/or circuitry for providing Data Fragmentation Statistical Analytics 424. The Data Fragmentation Analytics 424 includes logic for providing Per Link Fragmentation Statistics 426 and logic for providing Per Flow Fragmentation Statistics 428. The Data Fragmentation Statistical Analytics 424 monitors data PMTU for each of the egress links 410, 412, 414 and also monitors and keeps track of the fragmentation rates of data flows through each of the egress links 410, 412, 414 both on a per link basis 426 and on a per flow basis 428. This statistical data sent to the cloud-based SD-WAN Control Analytics 418 where it may be stored and analyzed by the Analytics 422. The Controller 420 can determine procedures for mitigating data fragmentation in the SD-WAN router 402. These procedures can then be sent to the SD-WAN router 402 to re-route data flows among the egress links 410, 412, 414 as described above in order to minimize or prevent data fragmentation.

Figure 5:
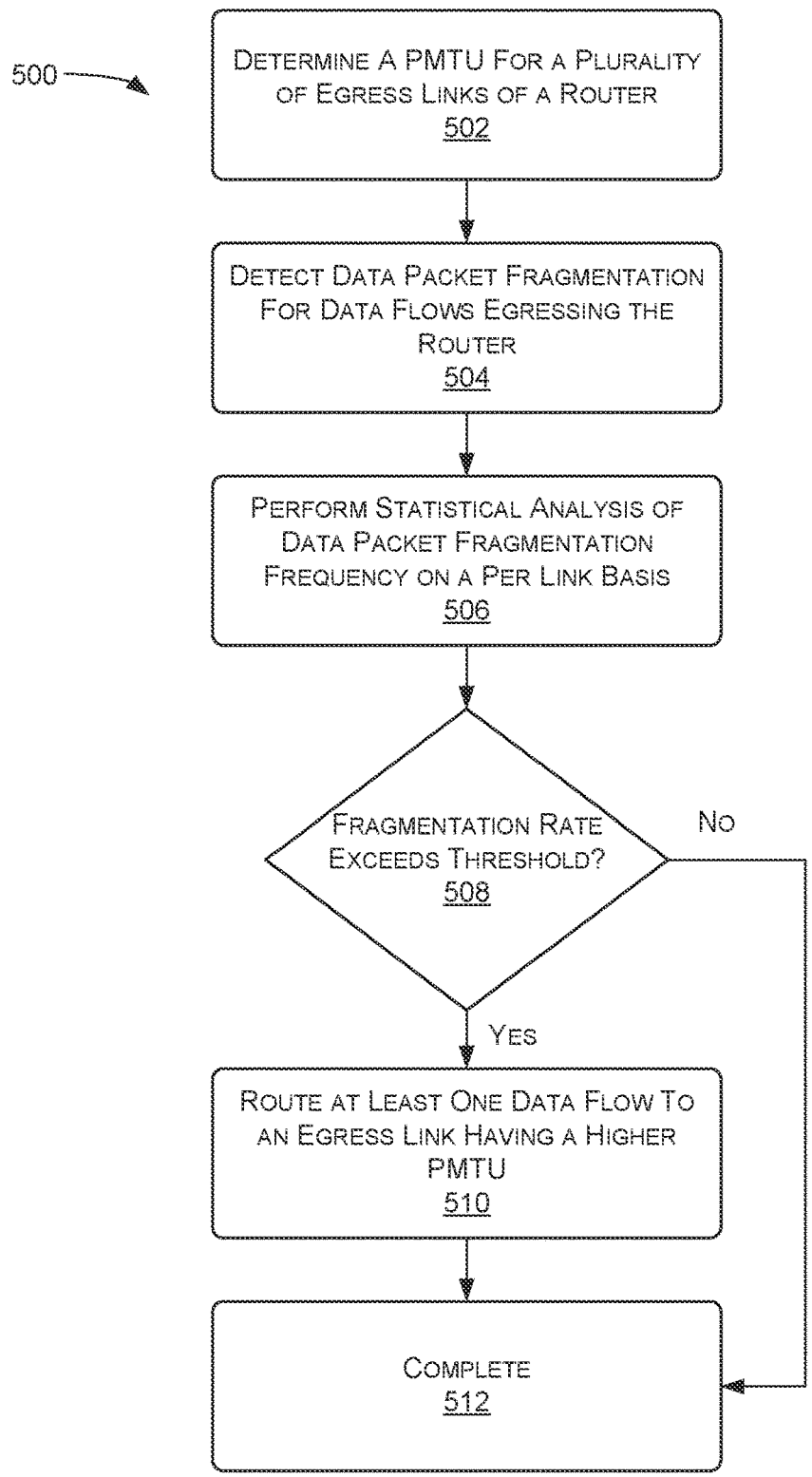
FIG. 5 illustrates a flow diagram for a method according to an embodiment for monitoring and reducing data fragmentation egressing an SD-WAN router, wherein statistical analysis of data fragmentation rates is performed on a per link basis.
Figure 6:
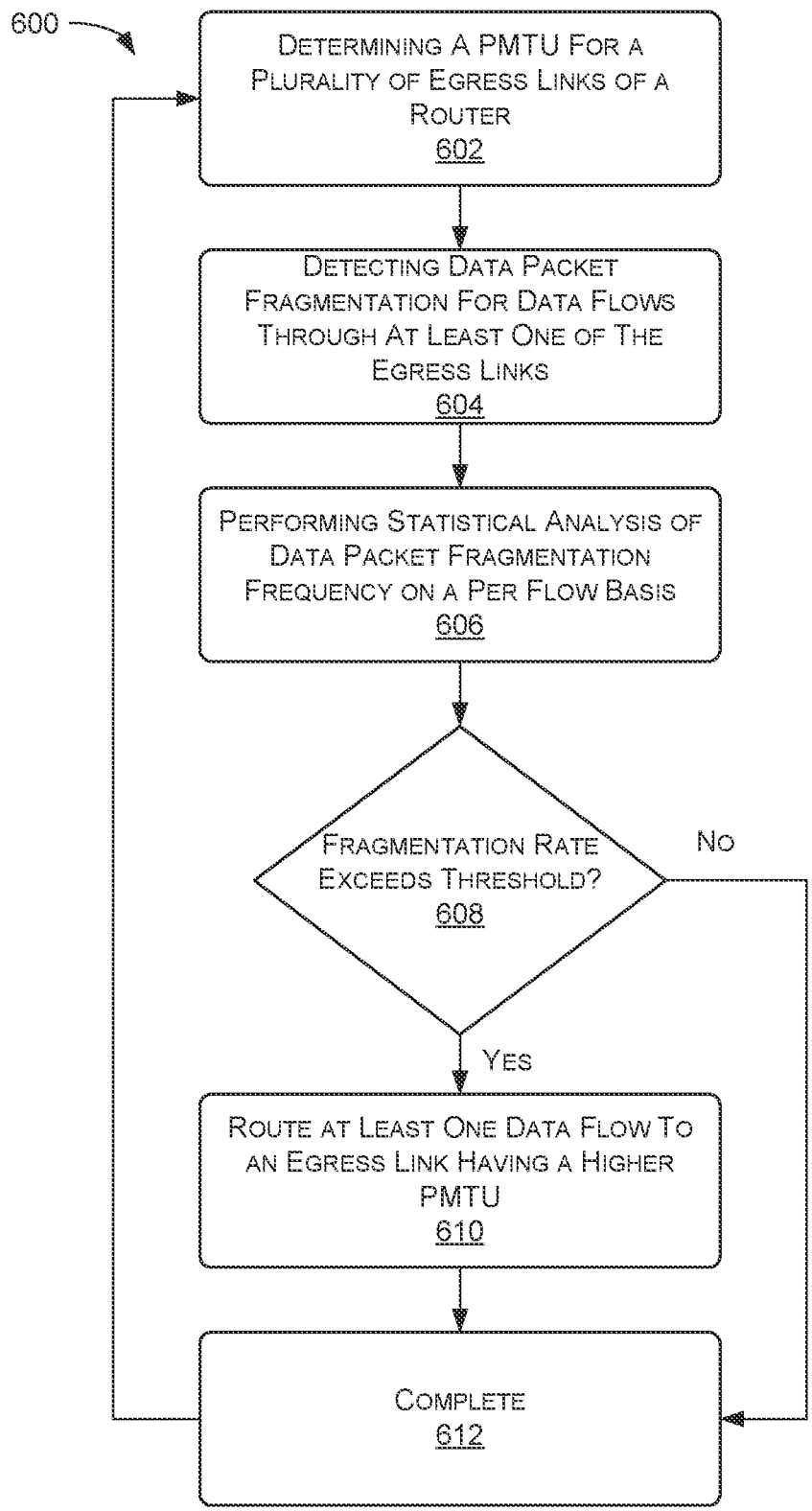
FIG. 6 illustrates a flow diagram for a method according to an embodiment for monitoring and reducing data fragmentation egressing an SD-WAN router, wherein statistical analysis of data fragmentation rates is performed on a per data flow basis.

FIGS. 5 and 6 illustrate flow diagrams of an example methods 500, 600 that illustrate aspects of the functions performed at least partly by the devices in the distributed application architecture as described in FIGS. 1-4. The logical operations described herein with respect to FIGS. 5 and 6 may be implemented (1) as a sequence of computer-implemented acts or program modules running on a computing system and/or (2) as interconnected machine logic circuits or circuit modules within the computing system. By way of example, one business entity 102, can be a facility such as a building, campus or other remote business facility. The other business entity 104 can be, for example, a data center, local area network or enterprise network.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more With reference to FIG. 5, a method 500 includes discovering a PMTU of a plurality of egress links of an SD-WAN router 502. In one embodiment, the PMTU of each of the plurality of links can be periodically determined and monitored. The periodically determined PMTU can be stored in a database for later retrieval, where the stored PMTU can be periodically updated. The PMTU can be continuously detected and determined using PMTU probes.

Data packet fragmentation is detected for data flows egressing one or more egress links of the SD-WAN router 504. Data packet fragmentation is detected and monitored on a per-link basis for a plurality of data flows. In one embodiment, data fragmentation of data flows through each of the plurality of egress links are continuously detected and monitored. The detected data fragmentation information can be stored in a database, in computer memory such as solid-state memory, magnetic memory, CPU, Application Specific Integrated Circuit (ASIC) memory, etc.

A statistical analysis of data fragmentation rates is performed 506. The statistical analysis can be performed on a per link basis to determine fragmentation rates for each of a plurality of data flows. Individual data flows that include a plurality of data packets can identified by information in the data packets, such a header data which can include a 5 tuple identifying individual data flows to which the data packets belong. The statistical analysis can be performed so as to determine whether data fragmentation rates of each flow exceed a predetermined acceptable threshold.

A determination can then be made as to whether the fragmentation rate of a link exceeds a predetermined threshold 508. The determination as to whether the fragmentation rate exceeds the predetermine threshold can be made on a link-by-link basis for each of a plurality of data flows egressing through the plurality of egress links of the SD-WAN router. In response to determining that the fragmentation rate of a link exceeds the predetermined threshold (yes) at least one data flow is routed to an egress link having another link, which preferably has PMTU than the link having the unacceptably high fragmentation rate 510. If data packets of data flows egressing through a first egress link are determined to have an unacceptably high fragmentation rate, then the data packets one or more data flows are re-routed from the first egress link to a second egress link, wherein the second egress link has a higher PMTU than the first egress link. One or more data flows through the egress link having an unacceptably high fragmentation rate can directed to other egress links by deemphasizing the egress link having the unacceptably high fragmentation rate to decrease data flow to that link. Logic can be provided for, upon determining that a packet is being fragmented, keeping a list of alternative suitable transport links having a PMTU greater than egress link through which the fragmented flow is egressing.

If the fragmentation rate does not exceed the predetermined threshold (no) then the data flow through the egress links is acceptable and the process is complete 512. Similarly, after routing the at least one data flow to an egress link having a higher PMTU the process is complete 512. The above-described process can be continuously repeated to ensure that fragmentation rates do not exceed the predetermined acceptable threshold. For example, after completing the process 512, the process can return to implement steps 502-510 on a continuous or repetitive basis to ensure that data flows efficiently through the SD-WAN router.

With reference now to FIG. 6, a method 600 includes determining a PMTU of a plurality of egress links of an SD-WAN router 602. In one embodiment, the PMTU of each of the plurality of links can be periodically determined and monitored. The periodically determined PMTU can be stored in a database for later retrieval, where the stored PMTU can be periodically updated. The PMTU can be continuously detected and determined using PMTU probes.

Data packet fragmentation is detected for data flows through data flows through the egress links of the SD-WAN router 604. The data packet fragmentation is detected and monitored for each egress link of the SD-WAN router. In one embodiment, data fragmentation of data flows through each of the plurality of egress links are continuously detected and monitored. The detected data fragmentation information can be stored in a database, in computer memory such as solid-state memory, magnetic memory, CPU, Application Specific Integrated Circuit (ASIC) memory, etc.

A statistical analysis of data fragmentation rates is performed 606. The statistical analysis can be performed on a per-flow basis to determine fragmentation rates for each of the egress links of the SD-WAN router. The statistical analysis can be performed so as to determine whether data fragmentation rates of any of the data flows exceeds a predetermined acceptable threshold. For example, each occurrence of a data fragmentation of a data packet for each egress link is detected, recorded and stored in the database. In one embodiment, the number of data fragmentations through each of the egress link can be compared with the number of data packets egressing through each egress link in order to determine a fragmentation rate as fragmentations per total number of data packets egressing through the egress link. In another embodiment, the number of fragmentations can be compared with a time period to determine fragmentations per time such as fragmentations per second or fragmentations per minute.

A determination can then be made as to whether the fragmentation rate exceeds a predetermined threshold 608. The determination as to whether the fragmentation rate exceeds the predetermine threshold can be made on a flow-by-flow basis for each of a plurality of data flows egressing through the plurality of egress links of the SD-WAN router. In response to determining that the fragmentation rate of a particular flow exceeds the predetermined threshold (yes) that particular data flow is routed to an egress link having a higher PMTU than the one through which it was flowing 610. If data packets of a particular data flow egressing through a first egress link are determined to have an unacceptably high fragmentation rate, then the data packets of that data flow are re-routed from the first egress link to a second egress link, wherein the second egress link has a higher PMTU than the first egress link. Logic can be provided for, upon determining that a packet is being fragmented, keeping a list of alternative suitable transport links having a PMTU greater than egress link through which the fragmented flow is egressing.

If the fragmentation rate does not exceed the predetermined threshold (no) then the data flow through the egress links is acceptable and the process is complete 612. Similarly, after routing the at least one data flow to an egress link having a higher PMTU the process is complete 612. The above-described process can be continuously repeated to ensure that fragmentation rates do not exceed the predetermined acceptable threshold. For example, after completing the process 612, the process can return to implement steps 602-610 on a continuous or repetitive basis to ensure that data flows efficiently through the SD-WAN router.

Figure 7:
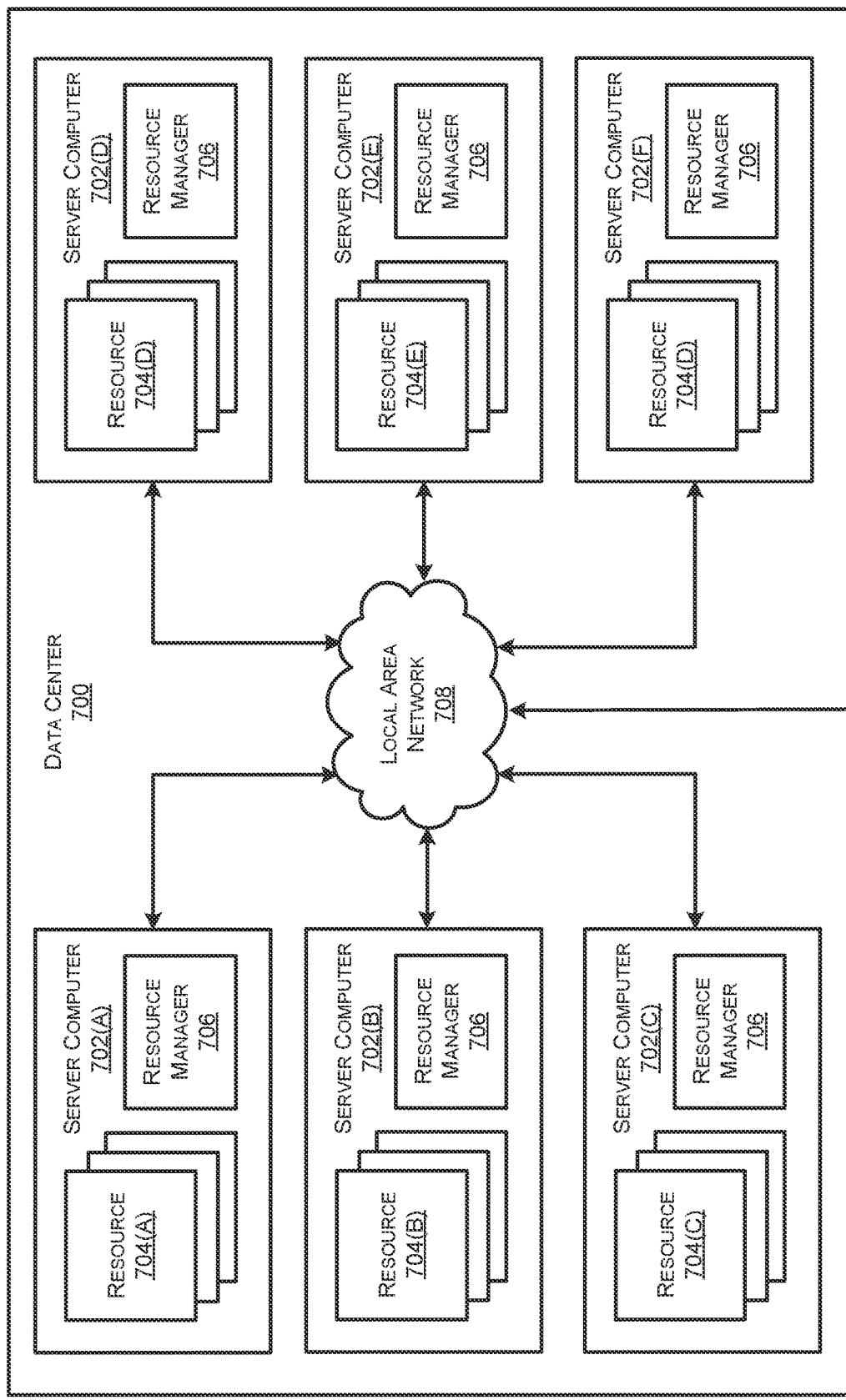
FIG. 7 illustrates a computing system diagram illustrating a configuration for a data center that can be utilized to implement aspects of the technologies disclosed herein.

FIG. 7 is a computing system diagram illustrating a configuration for a data center 700 that can be utilized to implement aspects of the technologies disclosed herein. The example data center 700 shown in FIG. 7 includes several server computers 702A-702F (which might be referred to herein singularly as "a server computer 702" or in the plural as "the server computers 702") for providing computing resources. In some examples, the resources and/or server computers 702 may include, or correspond to, the any type of networked device described herein. Although described as servers, the server computers 702 may comprise any type of networked device, such as servers, switches, routers, hubs, bridges, gateways, modems, repeaters, access points, etc.

The server computers 702 can be standard tower, rack-mount, or blade server computers configured appropriately for providing computing resources. In some examples, the server computers 702 may provide computing resources 704 including data processing resources such as VM instances or hardware computing systems, database clusters, computing clusters, storage clusters, data storage resources, database resources, networking resources, and others. Some of the servers 702 can also be configured to execute a resource manager 706 capable of instantiating and/or managing the computing resources. In the case of VM instances, for example, the resource manager 706 can be a hypervisor or another type of program configured to enable the execution of multiple VM instances on a single server computer 702. Server computers 702 in the data center 700 can also be configured to provide network services and other types of services.

In the example data center 700 shown in FIG. 7, an appropriate LAN 708 is also utilized to interconnect the server computers 702A-702F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 700, between each of the server computers 702A-702F in each data center 700, and, potentially, between computing resources in each of the server computers 702. It should be appreciated that the configuration of the data center 700 described with reference to FIG. 7 is merely illustrative and that other implementations can be utilized.

In some examples, the server computers 702 may each execute one or more application containers and/or virtual machines to perform techniques described herein.

In some instances, the data center 700 may provide computing resources, like application containers, VM instances, and storage, on a permanent or an as-needed basis. Among other types of functionality, the computing resources provided by a cloud computing network may be utilized to implement the various services and techniques described above. The computing resources 704 provided by the cloud computing network can include various types of computing resources, such as data processing resources like application containers and VM instances, data storage resources, networking resources, data communication resources, network services, and the like.

Each type of computing resource 704 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 704 not mentioned specifically herein.

The computing resources 704 provided by a cloud computing network may be enabled in one embodiment by one or more data centers 700 (which might be referred to herein singularly as "a data center 700" or in the plural as "the data centers 700"). The data centers 700 are facilities utilized to house and operate computer systems and associated components. The data centers 700 typically include redundant and backup power, communications, cooling, and security systems. The data centers 700 can also be located in geographically disparate locations. One illustrative embodiment for a data center 700 that can be utilized to implement the technologies disclosed herein will be described below with regard to FIG. 8.

Figure 8:
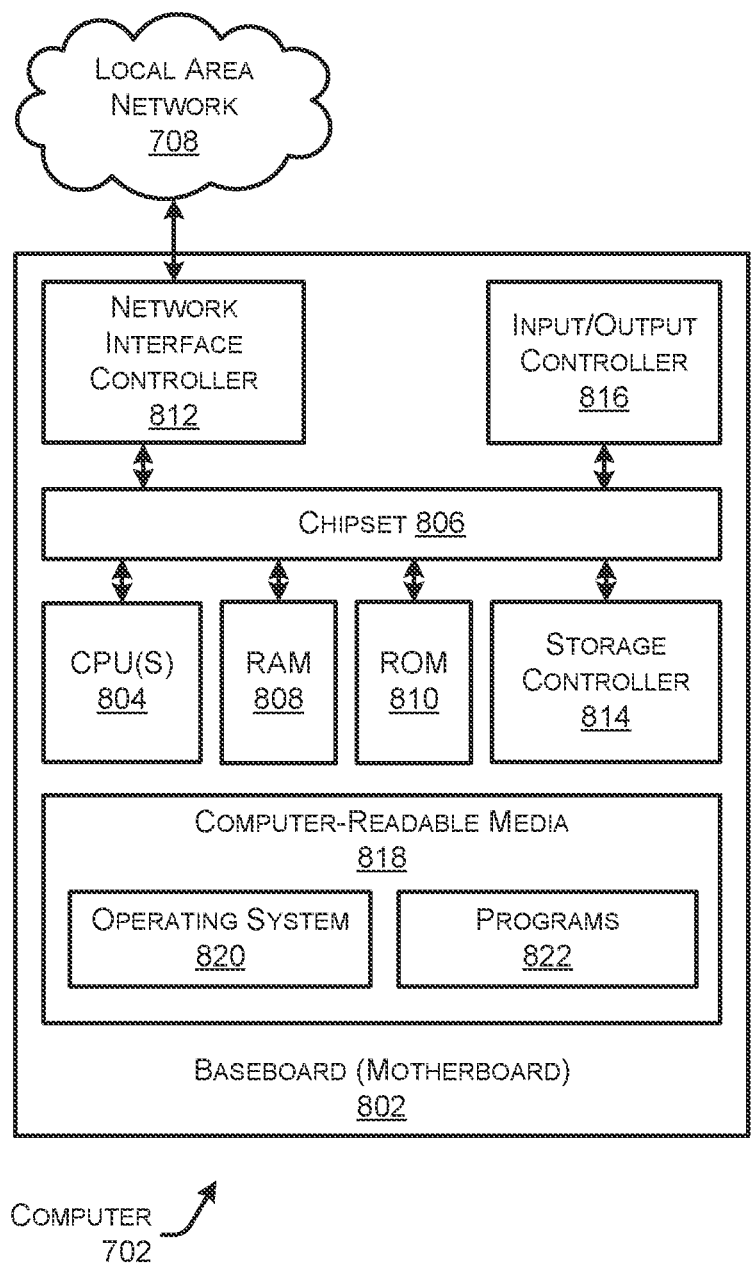
FIG. 8 is a computer architecture diagram showing an illustrative computer hardware architecture for implementing a computing device that can be utilized to implement aspects of the various technologies presented herein.

FIG. 8 shows an example computer architecture for a server computer 702 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein. The server computer 702 may, in some examples, correspond to a physical server, and may comprise networked devices such as servers, switches, routers, hubs, bridges, gateways, modems, repeaters, access points, etc.

The computer 702 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 702.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a RAM 808, used as the main memory in the computer 702. The chipset 806 can further provide an interface to a computer-readable storage medium such as a read-only memory ("ROM") 810 or non-volatile RAM ("NVRAM") for storing basic routines that help to startup the computer 702 and to transfer information between the various components and devices. The ROM 810 or NVRAM can also store other software components necessary for the operation of the computer 702 in accordance with the configurations described herein.

The computer 702 can operate in a networked environment using logical connections to remote computing devices and computer systems through a network, such as the network 708. The chipset 806 can include functionality for providing network connectivity through a NIC 812, such as a gigabit Ethernet adapter. The NIC 812 is capable of connecting the computer 702 to other computing devices over the network 708 (and/or 106). It should be appreciated that multiple NICs 812 can be present in the computer 702, connecting the computer to other types of networks and remote computer systems.

The computer 702 can be connected to a storage device 818 that provides non-volatile storage for the computer. The storage device 818 can store an operating system 820, programs 822, and data, which have been described in greater detail herein. The storage device 818 can be connected to the computer 702 through a storage controller 814 connected to the chipset 806. The storage device 818 can consist of one or more physical storage units. The storage controller 814 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 702 can store data on the storage device 818 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 818 is characterized as primary or secondary storage, and the like.

For example, the computer 702 can store information to the storage device 818 by issuing instructions through the storage controller 814 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 702 can further read information from the storage device 818 by detecting the physical states or characteristics of one or more particular locations within the physical storage units.

In addition to the mass storage device 818 described above, the computer 702 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 702. In some examples, the operations performed by devices in a distributed application architecture, and or any components included therein, may be supported by one or more devices similar to computer 702. Stated otherwise, some or all of the operations performed by the systems 100, 400, and or any components included therein, may be performed by one or more computer devices 702 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 818 can store an operating system 820 utilized to control the operation of the computer 702. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 818 can store other system or application programs and data utilized by the computer 702.

In one embodiment, the storage device 818 or other computer-readable storage media is encoded with computer-executable instructions which, when loaded into the computer 702, transform the computer from a general-purpose computing system into a special-purpose computer capable of implementing the embodiments described herein. These computer-executable instructions transform the computer 702 by specifying how the CPUs 804 transition between states, as described above. According to one embodiment, the computer 702 has access to computer-readable storage media storing computer-executable instructions which, when executed by the computer 702, perform the various processes described above with regard to FIGS. 1-6. The computer 702 can also include computer-readable storage media having instructions stored thereupon for performing any of the other computer-implemented operations described herein.

The computer 702 can also include one or more input/output controllers 816 for receiving and processing input from a number of input devices, such as a keyboard, a mouse, a touchpad, a touch screen, an electronic stylus, or other type of input device. Similarly, an input/output controller 816 can provide output to a display, such as a computer monitor, a flat-panel display, a digital projector, a printer, or other type of output device. It will be appreciated that the computer 702 might not include all of the components shown in FIG. 8, can include other components that are not explicitly shown in FIG. 8, or might utilize an architecture completely different than that shown in FIG. 8.

As described herein, the computer 702 may comprise one or more of a router, load balancer and/or server. The computer 702 may include one or more hardware processors 804 (processors) configured to execute one or more stored instructions. The processor(s) 804 may comprise one or more cores. Further, the computer 702 may include one or more network interfaces configured to provide communications between the computer 702 and other devices, such as the communications described herein as being performed by the router, load balancer and/or server. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 822 may comprise any type of programs or processes to perform the techniques described in this disclosure for providing a distributed application load-balancing architecture that is capable of supporting multipath transport protocol. That is, the computer 702 may comprise any one of the routers, load balancers, and/or servers. The programs 822 may comprise any type of program that cause the computer 702 to perform techniques for communicating with other devices using any type of protocol or standard usable for determining connectivity.

Figure 9:
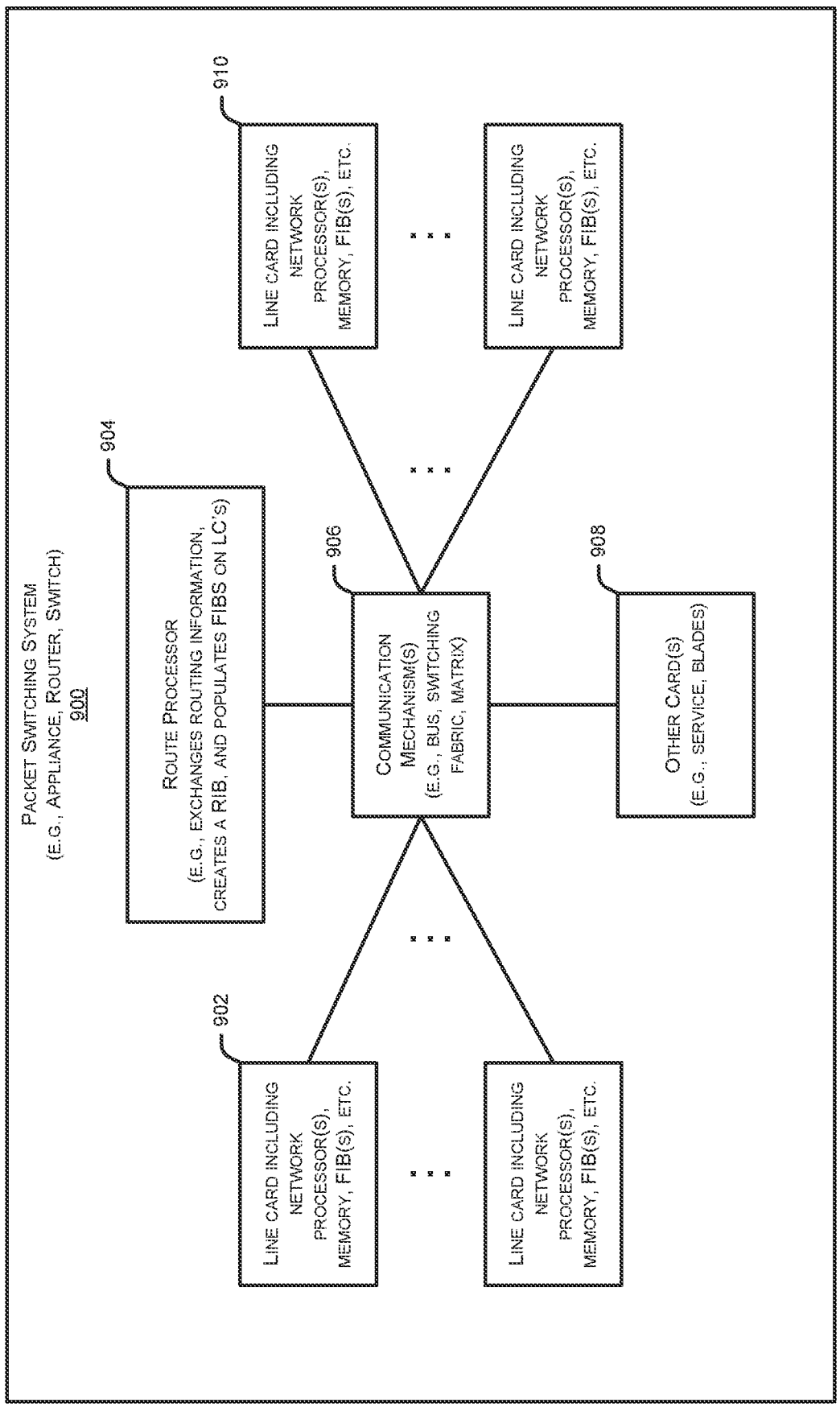
FIG. 9 illustrates a block diagram illustrating an example packet switching system that can be utilized to implement various aspects of the technologies disclosed herein.

FIG. 9 illustrates a block diagram illustrating an example packet switching device (or system) 900 that can be utilized to implement various aspects of the technologies disclosed herein. In some examples, packet switching device(s) 900 may be employed in various networks, such as, for example, network 106 as described with respect to FIG. 1.

In some examples, a packet switching device 900 may comprise multiple line card(s) 902, 910, each with one or more network interfaces for sending and receiving packets over communications links (e.g., possibly part of a link aggregation group). The packet switching device 900 may also have a control plane with one or more processing elements 905 for managing the control plane and/or control plane processing of packets associated with forwarding of packets in a network. The packet switching device 900 may also include other cards 908 (e.g., service cards, blades) which include processing elements that are used to process (e.g., forward/send, drop, manipulate, change, modify, receive, create, duplicate, apply a service) packets associated with forwarding of packets in a network. The packet switching device 900 may comprise hardware-based communication mechanism 906 (e.g., bus, switching fabric, and/or matrix, etc.) for allowing its different entities 902, 904, 908 and 910 to communicate. Line card(s) 902, 910 may typically perform the actions of being both an ingress and/or an egress line card 902, 910, in regard to multiple other particular packets and/or packet streams being received by, or sent from, packet switching device 900.

Figure 10:
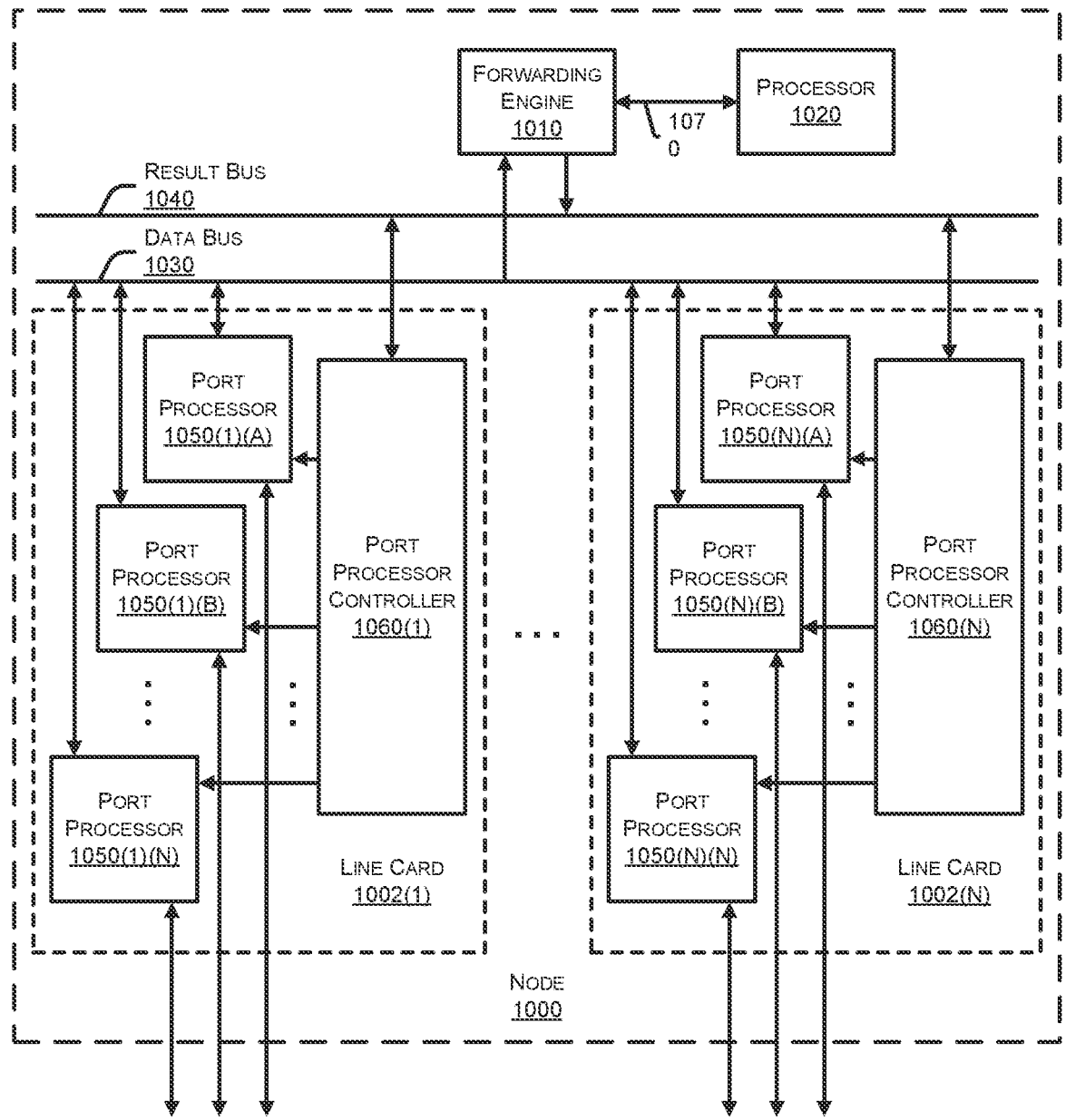
FIG. 10 illustrates a block diagram illustrating certain components of an example node that can be utilized to implement various aspects of the technologies disclosed herein.

FIG. 10 illustrates a block diagram illustrating certain components of an example node 1000 that can be utilized to implement various aspects of the technologies disclosed herein. In some examples, node(s) 1000 may be employed in various networks, such as, for example, network 106 as described with respect to FIG. 1.

In some examples, node 1000 may include any number of line cards 1002 (e.g., line cards 1002(1)-(N), where N may be any integer greater than 1) that are communicatively coupled to a forwarding engine 1010 (also referred to as a packet forwarder) and/or a processor 1020 via a data bus 1030 and/or a result bus 1040. Line cards 1002(1)-(N) may include any number of port processors 1050(1)(A)-(N)(N) which are controlled by port processor controllers 1060(1)-(N), where N may be any integer greater than 1. Additionally, or alternatively, forwarding engine 1010 and/or processor 1020 are not only coupled to one another via the data bus 1030 and the result bus 1040, but may also communicatively coupled to one another by a communications link 1070.

The processors (e.g., the port processor(s) 1050 and/or the port processor controller(s) 1060) of each line card 1002 may be mounted on a single printed circuit board. When a packet or packet and header are received, the packet or packet and header may be identified and analyzed by node 1000 (also referred to herein as a router) in the following manner. Upon receipt, a packet (or some or all of its control information) or packet and header may be sent from one of port processor(s) 1050(1)(A)-(N)(N) at which the packet or packet and header was received and to one or more of those devices coupled to the data bus 1030 (e.g., others of the port processor(s) 1050(1)(A)-(N)(N), the forwarding engine 1010 and/or the processor 1020). Handling of the packet or packet and header may be determined, for example, by the forwarding engine 1010. For example, the forwarding engine 1010 may determine that the packet or packet and header should be forwarded to one or more of port processors 1050(1)(A)-(N)(N). This may be accomplished by indicating to corresponding one(s) of port processor controllers 1060(1)-(N) that the copy of the packet or packet and header held in the given one(s) of port processor(s) 1050(1)(A)-(N)(N) should be forwarded to the appropriate one of port processor(s) 1050(1)(A)-(N)(N). Additionally, or alternatively, once a packet or packet and header has been identified for processing, the forwarding engine 1010, the processor 1020, and/or the like may be used to process the packet or packet and header in some manner and/or may add packet security information in order to secure the packet. On a node 1000 sourcing such a packet or packet and header, this processing may include, for example, encryption of some or all of the packet's or packet and header's information, the addition of a digital signature, and/or some other information and/or processing capable of securing the packet or packet and header. On a node 1000 receiving such a processed packet or packet and header, the corresponding process may be performed to recover or validate the packet's or packet and header's information that has been secured.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method for reducing data packet fragmentation in an SD-WAN router, the method comprising:
   determining Path Maximum Transfer Unit (PMTU) values of a plurality of egress links of a router;
   detecting data packet fragmentation for data flows through at least one egress link of the plurality of egress links;
   performing a statistical analysis of the data packet fragmentation to determine whether a data fragmentation rate of a first egress link of the plurality of egress links exceeds a threshold value, the data fragmentation rate being based on a number of data fragmentations and a number of data packets egressing through the first egress link; and
   in response to determining that the data fragmentation rate through the first egress link exceeds the threshold value, routing at least one data flow from the first egress link to a second egress link of the plurality of egress links, the second egress link having a PMTU value that is higher than a PMTU value of the first egress link.

2. The method as in claim 1, wherein the statistical analysis of the data packet fragmentation is performed on a per flow basis.

3. The method as in claim 1, wherein the statistical analysis of the data packet fragmentation is performed for each egress link of the plurality of egress links.

4. The method as in claim 1, wherein the statistical analysis of the data packet fragmentation is performed on a per flow basis, and wherein the determination that the data fragmentation rate exceeds the threshold value includes:
   discovering the PMTU value for each egress link of the plurality of egress links;
   determining a per flow threshold packet fragmentation rate;
   determining a path fragmentation rate for a data flow egressing through the first egress link; and
   in response to determining that the path fragmentation rate for the data flow exceeds the threshold value, routing the data flow through the second egress link having the PMTU value that is greater than the PMTU value of the first egress link.

5. The method as in claim 1, wherein the statistical analysis of the data packet fragmentation is performed on a per egress link basis, and wherein the determination that the data fragmentation rate exceeds the threshold value includes:
   discovering the PMTU value for each egress link of the plurality of egress links;
   determining a per egress link threshold packet fragmentation rate;
   determining a packet fragmentation rate for each egress link of the plurality of egress links; and
   in response to determining that the packet fragmentation rate of the first egress link exceeds the threshold value, rerouting at least one data flow from the first egress link to the second egress link having the PMTU value that is greater than the PMTU value of the first egress link.

6. The method as in claim 1, wherein:
   the statistical analysis of the data packet fragmentation is performed on a per egress link basis; and
   the method further includes upon determining that the first egress link of the plurality of egress links has a packet fragmentation rate greater than the threshold value, deemphasizing packet flow to the first egress link to decrease data flow to the first egress link and increase the data flow to other egress links of the plurality of egress links.

7. The method as in claim 1, wherein the statistical analysis includes:

determining a per flow fragmentation rate;
determining a per flow most fragmented packet size;
determining an aggregated fragmentation rate of each egress link of the plurality of egress links; and
upon determining that a packet is being fragmented, keeping a list of alternative suitable transport links having PMTU values greater than an egress link through which the packet is egressing.

8. A networking device comprising:
one or more processors; and
one or more non-transitory computer-readable media storing computer-executable instructions that, when executed by the one or more processors, cause the one or more processors to perform operations comprising:
determining Path Maximum Transfer Unit (PMTU) values of a plurality of egress links of a router;
detecting data packet fragmentation for data flows through at least one egress link of the plurality of egress links;
performing a statistical analysis of the data packet fragmentation to determine whether a data fragmentation rate through a first egress link of the plurality of egress links exceeds a threshold value, the data fragmentation rate comprising an amount of data fragmentations through the first egress link that occurs over a period of time; and
in response to determining that the data fragmentation rate through the first egress link exceeds the threshold value, routing at least one data flow to a second egress link of the plurality of egress links having a PMTU value that is higher than a PMTU of the first egress link.

9. The networking device as in claim 8, wherein the statistical analysis of the data packet fragmentation is performed on a per data flow basis.

10. The networking device as in claim 8, wherein the statistical analysis of the data packet fragmentation is performed on each of the plurality of egress links.

11. The networking device as in claim 8, wherein the statistical analysis of the data packet fragmentation is performed on a per flow basis, and wherein the determination that the data fragmentation rate exceeds the threshold value includes:
discovering a PMTU value for each egress link of the plurality of egress links;
determining a per flow threshold packet fragmentation rate;
determining a path fragmentation rate for a data flow egressing through the first egress link of the plurality of egress links; and
in response to determining that the path fragmentation rate for the data flow exceeds the threshold value, routing the data flow through the second egress link having the PMTU that is greater than the PMTU of the first egress link.

12. The networking device as in claim 8, wherein the statistical analysis of the data packet fragmentation is performed on a per egress link basis, and wherein the determination that the data fragmentation rate exceeds the threshold value includes:
discovering a PMTU value for each egress link of the plurality of egress links;
determining a per egress link threshold packet fragmentation rate;
determining a packet fragmentation rate for each egress link of the plurality of egress links; and
in response to determining that the packet fragmentation rate of the first egress link exceeds the threshold value, rerouting at least one data flow from the first egress link to the second egress link having the PMTU value that is greater than the PMTU value of the first egress link.

13. The networking device as in claim 8, wherein the statistical analysis of the data packet fragmentation is performed on a per egress link basis, and wherein the operations further include, upon determining that the first egress link of the plurality of egress links has a packet fragmentation rate greater than the threshold value, deemphasizing a packet flow to the first egress link to decrease data flow to the first egress link and increase the data flow to other egress links of the plurality of egress links.

14. The networking device as in claim 8, wherein the statistical analysis includes:
determining a per flow fragmentation rate;
determining a per flow most fragmented packet size;
determining an aggregated fragmentation rate of each egress link of the plurality of egress links; and
upon determining that a packet of a particular flow is being fragmented, keeping a list of alternative suitable transport links having PMTU values greater than an egress link through which the particular flow is egressing.

15. One or more non-transitory computer-readable media storing computer-executable instructions that, when executed by one or more processors, cause the one or more processors to perform operations comprising:
determining Path Maximum Transfer Unit (PMTU) values of a plurality of egress links of a router;
detecting data packet fragmentation for data flows through at least one egress link of the plurality of egress links;
performing a statistical analysis of the data packet fragmentation to determine whether a data fragmentation rate of a first egress link exceeds a threshold value, the data fragmentation rate being based in part on an amount of data fragmentations occurring through the first egress link; and
in response to determining that the data fragmentation rate exceeds the threshold value, routing at least one data flow of the data flows to a second egress link having a PMTU value that is higher than a PMTU value of the first egress link.

16. The one or more non-transitory computer-readable media as in claim 15, wherein the statistical analysis of the data packet fragmentation is performed on a per flow basis.

17. The one or more non-transitory computer-readable media as in claim 15, wherein the statistical analysis of the data packet fragmentation is performed on a per egress link basis.

18. The one or more non-transitory computer-readable media as in claim 15, wherein the statistical analysis of the data packet fragmentation is performed on a per flow basis, and wherein the determination that the data fragmentation rate exceeds the threshold value includes:
discovering the PMTU value for each egress link of the plurality of egress links;
determining a per flow threshold packet fragmentation rate;
determining a path fragmentation rate for a data flow egressing through the first egress link of the plurality of egress links; and
in response to determining that the path fragmentation rate for the data flow exceeds the threshold value, routing the data flow through the second egress link having the PMTU value that is greater than the PMTU value of the first egress link.

19. The one or more non-transitory computer-readable media as in claim 15, wherein the statistical analysis of the data packet fragmentation is performed on a per egress link basis, and wherein the determination that the data fragmentation rate exceeds the threshold value includes:

discovering the PMTU value for each egress link of the plurality of egress links;

determining a per egress link threshold packet fragmentation rate;

determining a packet fragmentation rate for each egress link of the plurality of egress links; and in response to determining that the packet fragmentation rate of the first egress link exceeds the threshold value, rerouting at least one data flow from the first egress link to the second egress link having the PMTU value that is greater than the PMTU value of the first egress link.

20. The one or more non-transitory computer-readable media as in claim 15, wherein the statistical analysis of the data packet fragmentation is performed on a per egress link basis, and wherein the operations further include, upon determining that the first egress link of the plurality of egress links has a packet fragmentation rate greater than the threshold value, deemphasizing at least one packet flow to the first egress link to decrease data flow to the first egress link and increase data flows to other egress links of the plurality of egress links.

* * * * *